(12) United States Patent
He et al.

(10) Patent No.: US 8,794,257 B2
(45) Date of Patent: Aug. 5, 2014

(54) LIQUID STORAGE DEVICE

(75) Inventors: Jinqun He, Beijing (CN); Likun Pei, Beijing (CN); Yi Wu, Beijing (CN); Wei Zan, Beijing (CN)

(73) Assignee: Beijing Sevenstar Electronics Co., Ltd., Beijing (CN)

( * ) Notice: Subject to any disclaimer, the term of this patent is extended or adjusted under 35 U.S.C. 154(b) by 42 days.

(21) Appl. No.: 13/701,903

(22) PCT Filed: Jun. 13, 2012

(86) PCT No.: PCT/CN2012/076828
§ 371 (c)(1),
(2), (4) Date: Dec. 4, 2012

(87) PCT Pub. No.: WO2013/053241
PCT Pub. Date: Apr. 18, 2013

(65) Prior Publication Data
US 2013/0174919 A1    Jul. 11, 2013

(30) Foreign Application Priority Data

Oct. 9, 2011   (CN) .......................... 2011 1 0303518

(51) Int. Cl.
*B67D 7/72*       (2010.01)
*G05D 16/16*    (2006.01)
*G05D 16/00*    (2006.01)

(52) U.S. Cl.
CPC ................ *G05D 16/16* (2013.01); *G05D 16/00* (2013.01)
USPC ........................................... 137/209; 137/206

(58) Field of Classification Search
CPC ........ B95D 90/38; B95D 90/44; G05D 16/16; F17D 1/12; F17D 1/20; B67D 7/0238
USPC ........................ 137/205, 206, 207, 209, 540
See application file for complete search history.

(56) References Cited

U.S. PATENT DOCUMENTS

| | | | | |
|---|---|---|---|---|
| 2,132,132 A | * | 10/1938 | Seat | 137/209 |
| 4,246,926 A | * | 1/1981 | Morello | 137/209 |
| 4,867,195 A | * | 9/1989 | Blewett et al. | 137/206 |

FOREIGN PATENT DOCUMENTS

CN          201857044       *   6/2011

OTHER PUBLICATIONS

Wang, Liquid storage device, Jun. 8, 2011, English tranlsation of CN201857044, taken from GPSN website.*
Wang, Liquid storage device, Jun. 8, 2011, English abstract of CN201857044, taken from derwent website.*

* cited by examiner

*Primary Examiner* — Craig Schneider
*Assistant Examiner* — Craig J Price
(74) *Attorney, Agent, or Firm* — Anova Law Group, PLLC

(57) ABSTRACT

The present invention provides a liquid storage device relates to the field of semiconductor manufacturing technology comprising: a liquid storage tank, a liquid intake tube, a liquid discharge tube and a gas discharge tube; the liquid intake tube, the liquid discharge tube and the gas discharge tube are all connected with the liquid storage tank; the liquid storage device also comprises a gas compensating tube connected with the liquid storage tank; the gas compensating tube comprises a differential pressure mechanism and a gas storage tank; one end of the differential pressure mechanism is connected with the liquid storage tank, and the other end is connected with the gas storage tank; the differential pressure mechanism is used for controlling the connection or disconnection between the liquid storage tank and the gas storage tank according to the pressure difference therebetween.

14 Claims, 5 Drawing Sheets

--Prior Art--

--Prior Art--

US 8,794,257 B2

LIQUID STORAGE DEVICE

CROSS-REFERENCE TO RELATED APPLICATION

This application claims the priority benefit of China application serial no. 201110303518.9, filed Oct. 9, 2011. All disclosure of the China application is incorporated herein by reference.

FIELD OF THE INVENTION

The present invention relates to the field of semiconductor manufacturing technology, more particularly to a liquid storage device.

BACKGROUND OF THE INVENTION

Conventionally in the IC manufacturing process, different cleaning processes are required for the silicon wafers and during the cleaning processes, different chemical liquids may be used. For example, the chemical liquid ST250 is generally used in a cleaning apparatus for cleaning copper interconnections; the chemical liquids such as ammonia, oxyful, hydrofluoric acid, etc are generally used in a cleaning apparatus for cleaning polished wafers. In addition, the purity of the chemical liquids is highly required. In the cleaning processes, the different chemical liquids are usually transported to each machine of the equipment through chemical liquid storage devices.

The Chinese patent No.201857044U discloses a conventional chemical liquid storage device. As shown in FIG. 1, the conventional liquid storage device generally comprises a liquid storage tank 110, a liquid intake tube 120, a liquid discharge tube 130, a gas intake tube 140, a pressure relief tube 150, a pressure relief valve 151 disposed on the pressure relief tube 150, a vacuum breaking tube 160, and a vacuum breaking valve 161 disposed on the vacuum breaking tube 160; the liquid intake tube 120, the liquid discharge tube 130 and the gas intake tube 140 are all connected with the liquid storage tank 110.

Referring to FIG. 2, the patent mentioned above also describes an improved liquid storage device 200 comprising a liquid storage tank 210, a liquid intake tube 220, a liquid discharge tube 230, a gas intake tube 240 and a liquid pressure maintaining device; the liquid intake tube 220, the liquid discharge tube 230, and the gas intake tube 240 are all connected with the liquid storage tank 210; the liquid pressure maintaining device comprises an overflow tube 250 and a liquid seal container 260 with liquid stored therein; one end of the overflow tube 250 is connected with the liquid storage tank 210, and the other end extends into the liquid in the liquid seal container 260. The liquid seal container 260 is an opening container comprising a side wall 261 and a bottom wall 262 connected with the side wall 261. The liquid pressure maintaining device also comprises a liquid infusion tube 270 and a liquid drain tube 280, the liquid infusion tube 270 and the liquid drain tube 280 are both connected with the side wall 261 of the liquid seal container 260. A first valve 221 is arranged on the liquid intake tube 220 for controlling the on-off of the liquid intake tube 220; a second valve 231 is arranged on the liquid discharge tube 230; and a third valve 241 is arranged on the gas intake tube 240.

The main difference between the two liquid storage devices mentioned above is the operation way of the device under a gas overpressure condition and a gas underpressure condition. The liquid storage device illustrated in FIG. 1 utilizes the pressure relief valve and the vacuum breaking valve to control the pressure in the liquid storage tank. However, since the pressure relief valve and the vacuum breaking valve are interlock mechanisms and easy to lose mechanical sensitivity after being used for a certain time, the pressure in the storage tank may become unstable which may result in the damage of the tank and affect the whole manufacturing process. The liquid storage device illustrated in FIG. 2 utilizes the overflow tube and the liquid seal container to maintain a stable pressure in the liquid storage tank. However, the depth of the overflow tube extending into the liquid seal container is required to be adjusted to prevent the liquid in the liquid seal container flowing back into the liquid storage tank. Moreover, since the liquid in the liquid seal container is generally de-ionized water which encourages the growth of bacterial, the control of the quality of the de-ionized water in the liquid seal container is required and has to be taken into consideration during the application of the de-ionized water.

SUMMARY OF THE INVENTION

Accordingly, at least one objective of the present invention is to provide a liquid storage device to prevent the chemical liquids being damaged and enable a fluent discharge of the chemical liquids.

To achieve these and other advantages and in accordance with the objective of the invention, as embodied and broadly described herein. The invention provides a liquid storage device comprising a liquid storage tank, a liquid intake tube, a liquid discharge tube and a gas discharge tube; the liquid intake tube, the liquid discharge tube and the gas discharge tube are all connected with the liquid storage tank; the liquid storage device further comprises a gas compensating tube connected with the liquid storage tank; wherein the gas compensating tube comprises a gas storage tank; and a differential pressure mechanism having one end connected with the liquid storage tank and the other end connected with the gas storage tank for controlling the connection or disconnection between the liquid storage tank and the gas storage tank according to the pressure difference therebetween.

In the device mentioned above, the differential pressure mechanism comprises an outer wall, a seal, a sealing plate, and an elastic element; one end of the outer wall is connected with the liquid storage tank, and the other end is connected with the gas storage tank; the seal is fixed on the inside surface of the outer wall; the sealing plate is fixed to one end of the elastic element to open or close the tube between the liquid storage tank and the gas storage tank in conjunction with the elastic element, the other end of the elastic component is fixed to the outer wall.

In the device mentioned above, the elastic element is a spring.

In the device mentioned above, the liquid intake tube, the gas discharge tube, and the gas compensating tube are all connected to the top wall of the liquid storage tank; the liquid discharge tube is connected to the bottom wall of the liquid storage tank.

In the device mentioned above, the liquid intake tube is provided with a first valve, the liquid discharge tube is provided with a second valve, and the gas discharge tube is provided with a check valve.

In the device mentioned above, the liquid storage further comprises a gas intake tube connected with the liquid storage tank.

In the device mentioned above, the gas intake tube is connected to the top wall of the liquid storage tank.

In the device mentioned above, the gas intake tube is provided with a third valve.

In the device mentioned above, the shape of the liquid storage tank is cylinder, cone, cuboid, or a combination of cylinder and cone.

According to the present invention, a gas compensating tube is provided to replace the liquid seal container in the prior art, which can supply protective gas into the liquid storage tank rapidly, prevent the chemical liquids in the liquid storage tank being damaged and enable a smooth discharge of the chemical liquids.

BRIEF DESCRIPTION OF THE DRAWINGS

The liquid storage device of the present invention will be elucidated by reference to the following embodiments and the accompanying drawings, in which.

DETAILED DESCRIPTION OF THE EMBODIMENTS

The liquid storage device of the presently preferred embodiments are discussed in further details hereinafter with respect the embodiments and the accompanying drawings. However, the embodiments described herein are not the only applications or uses contemplated for the invention. The specific embodiments discussed are merely illustrative of specific ways to make and use the invention, and do not limit the scope of the invention or the appended claims.

In the liquid storage device according to the present invention, a gas storage tank and a differential pressure mechanism are utilized to supply gas to the liquid storage tank quickly. In addition, when the pressure difference between the gas storage tank and the liquid storage tank reaches a preset value, the differential pressure mechanism will open or close automatically.

First Embodiment

Figure 1:
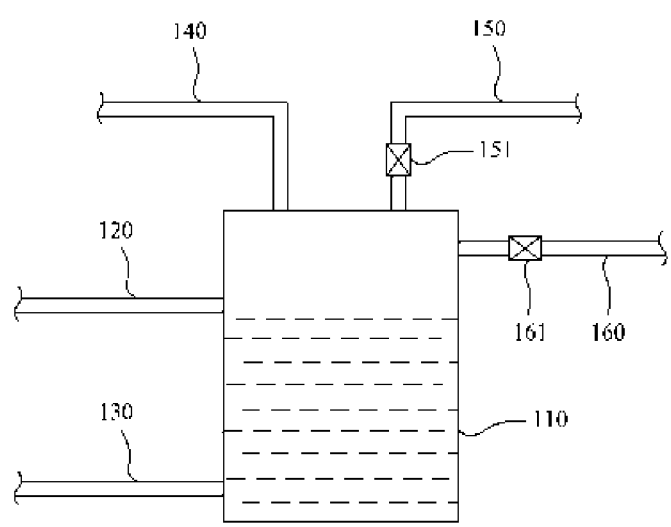
FIG. 1 is a schematic diagram of a conventional liquid storage device.
Figure 2:
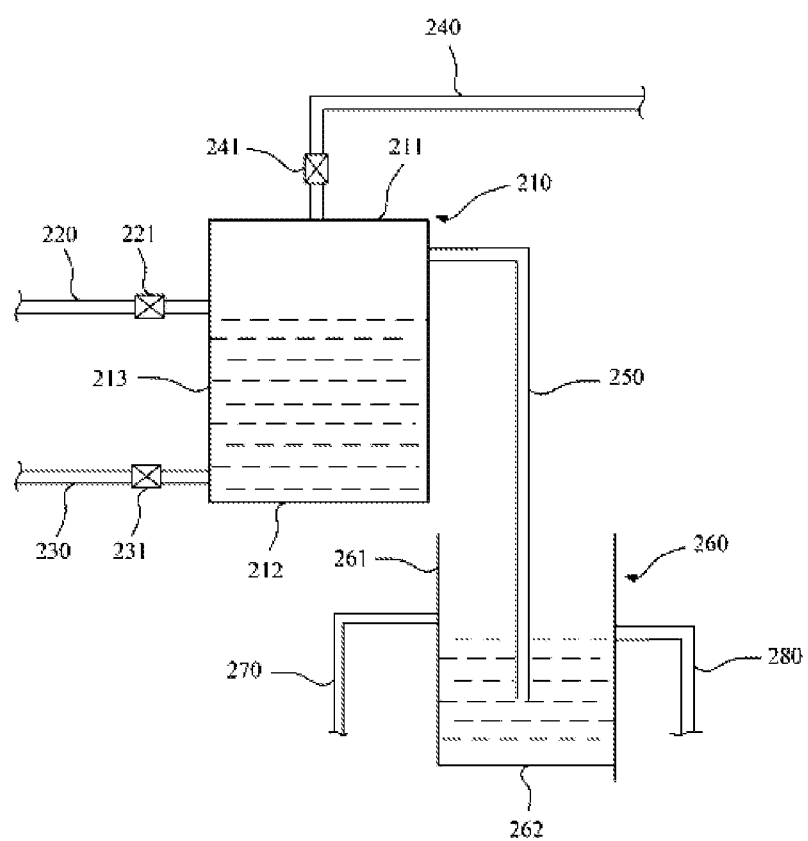
FIG. 2 is a schematic diagram of another conventional liquid storage device.
Figure 3:
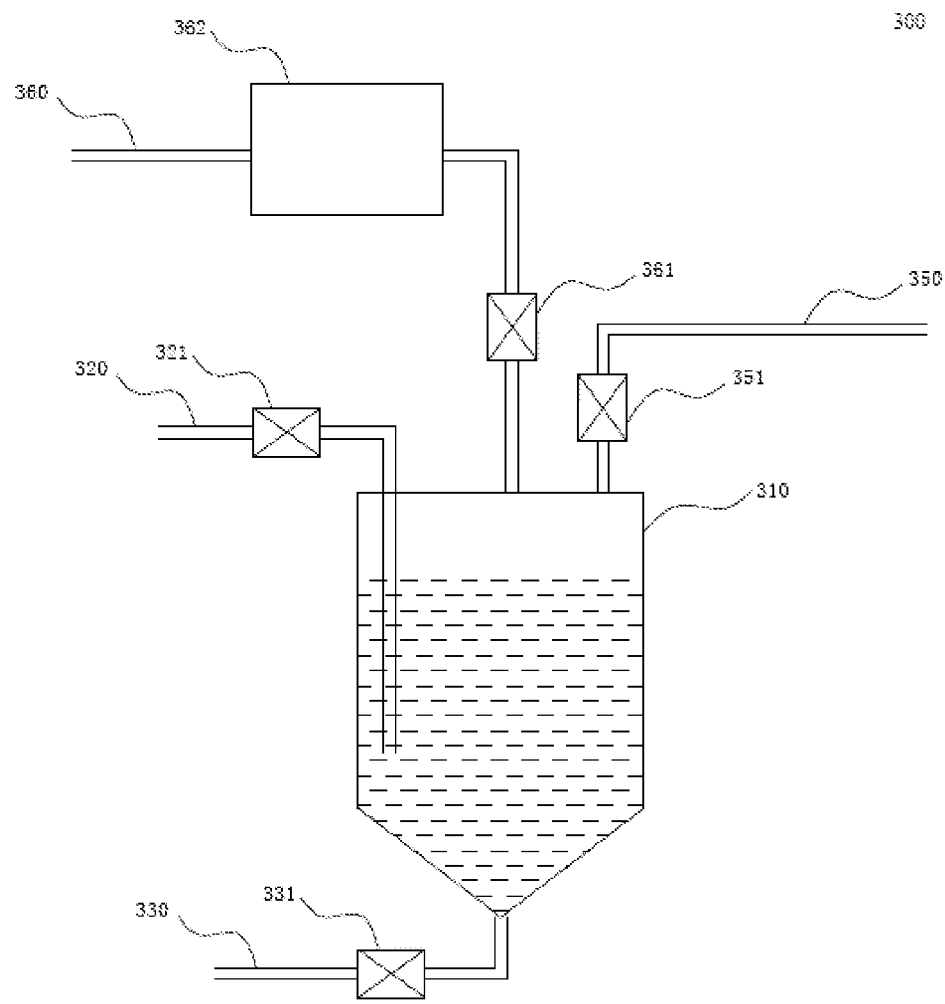
FIG. 3 is a schematic diagram of the liquid storage device according to an embodiment of the present invention.

As shown in FIG. 3, which is a schematic diagram of the liquid storage device according to the present invention, the liquid storage device 300 comprises a liquid storage tank 310, a liquid intake tube 320, a liquid discharge tube 330, a gas discharge tube 350, and a gas compensating tube 360; the liquid intake tube 320, the liquid discharge tube 330, the gas discharge tube 350 and the gas compensating tube 360 are all connected with the liquid storage tank 310. The shape of the liquid storage tank 310 can be cylinder, cone, cuboid, or another shape. In the present embodiment, the shape of the liquid storage tank 310 is a combination of cylinder and cone. The liquid intake tube 320, the gas discharge tube 350, and the gas compensating tube 360 are all connected to the top wall of the liquid storage tank 310; the liquid discharge tube 330 is connected to the bottom wall of the liquid storage tank 310.

A valve 321 is arranged on the liquid intake tube 320 for controlling the on-off of the liquid intake tube 320; a valve 331 is arranged on the liquid discharge tube 330 for controlling the on-off of the liquid discharge tube 330; and a check valve 351 is arranged on the gas discharge tube 350.

Figure 5:
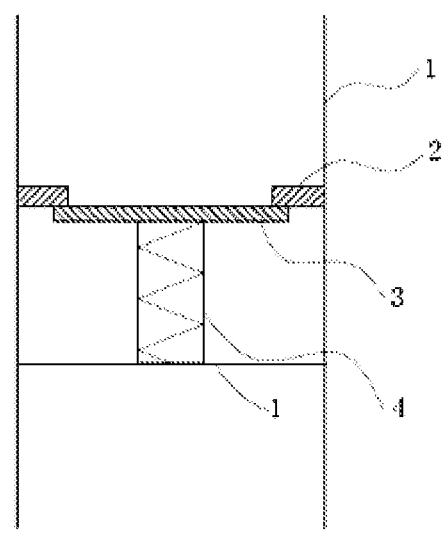
FIG. 5 is a schematic diagram of the differential pressure mechanism in the liquid storage device illustrated in FIG. 3 or FIG. 4.

Referring to FIG. 3, the gas compensating tube 360 comprises a differential pressure mechanism 361 and a gas storage tank 362. One end of the differential pressure mechanism 361 is connected with the liquid storage tank 310, and the other end is connected with the gas storage tank 362. Referring to FIG. 5, which is a schematic diagram of the differential pressure mechanism 361, the differential pressure mechanism 361 comprises an outer wall 1, a seal 2, a sealing plate 3, and a spring 4. The two ends of the outer wall 1 are connected with the liquid storage tank 310 and the gas storage tank 362, respectively. The seal 2 is fixed on the inside surface of the outer wall 1, the sealing plate 3 is fixed to one end of the spring 4, and the other end of the spring 4 is fixed to the outer wall 1. The sealing plate 3 will move up and down with the deformation of the spring 4. When the pressure difference between the pressure in the gas storage tank 362 and that in the liquid storage tank 310 is higher than a preset value, the spring 4 will be compressed and the sealing plate 3 will move down with the spring 4, thus the gas in the gas storage tank 362 can flow into the liquid storage tank 310.

The selection of the type of the spring used in the differential pressure mechanism 361 is related to the gas pressure in the gas storage tank 362, the inner diameter of the gas compensating tube 360 and the gas pressure above the liquid in the liquid storage tank 310.

Second Embodiment

Figure 4:
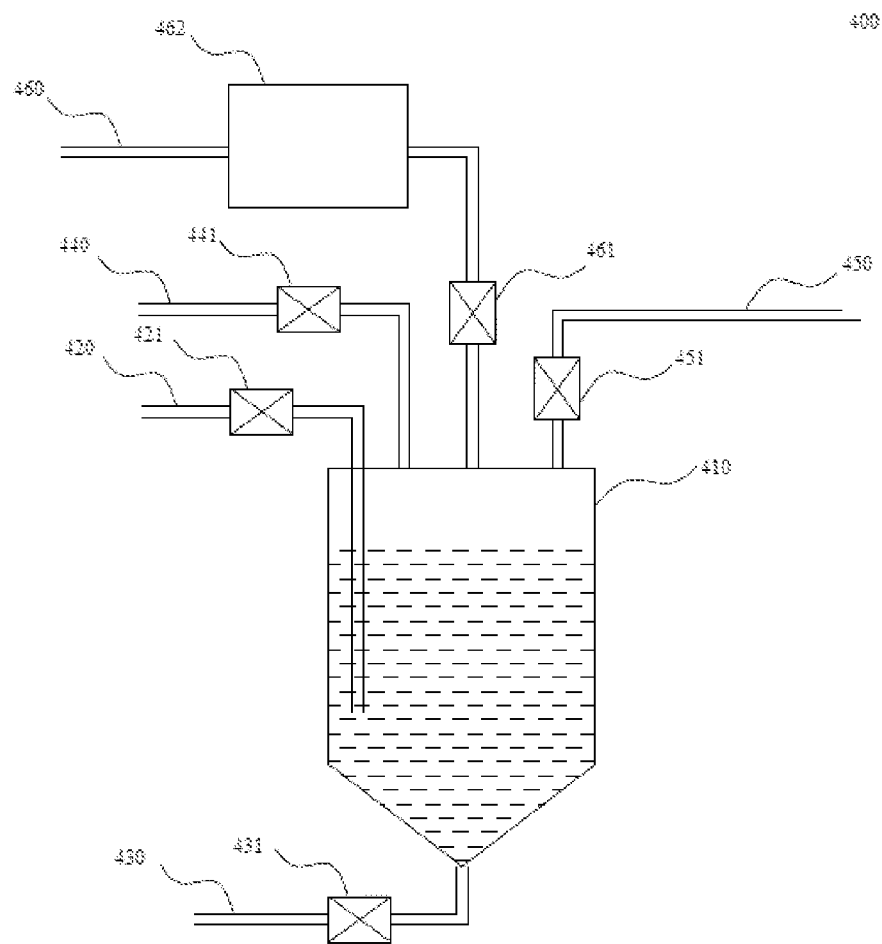
FIG. 4 is a schematic diagram of the liquid storage device according to another embodiment of the present invention.

As shown in FIG. 4, the liquid storage device 400 according to the present invention comprises a liquid storage tank 410, a liquid intake tube 420, a liquid discharge tube 430, a gas intake tube 440, a gas discharge tube 450, and a gas compensating tube 460; the liquid intake tube 420, the liquid discharge tube 430, the gas intake tube 440, the gas discharge tube 450 and the gas compensating tube 460 are all connected with the liquid storage tank 410. The shape of the liquid storage tank 410 can be cylinder, cone, cuboid, or another shape. In the present embodiment, the shape of the liquid storage tank 410 is a combination of cylinder and cone. The liquid intake tube 420, the gas intake tube 440, the gas discharge tube 450, and the gas compensating tube 460 are all connected to the top wall of the liquid storage tank 410, and the liquid discharge tube 430 is connected to the bottom wall of the liquid storage tank 410.

A valve 421 is arranged on the liquid intake tube 420 for controlling the on-off of the liquid intake tube 420; a valve 431 is arranged on the liquid discharge tube 430 for controlling the on-off of the liquid discharge tube 430; a valve 441 is arranged on the gas intake tube 440 for controlling the on-off of the gas intake tube 440; a check valve 351 is arranged on the gas discharge tube 450.

Referring to Fig.4, the gas compensating tube 460 comprises a differential pressure mechanism 461 and a gas storage tank 462. One end of the differential pressure mechanism 461 is connected with the liquid storage tank 410, and the other end is connected with the gas storage tank 462. Referring to Fig.5, which is a schematic diagram of the differential pressure mechanism 461, the differential pressure mechanism 461 comprises an outer wall 1, a seal 2, a sealing plate 3, and a spring 4. The two ends of the outer wall 1 are connected with the liquid storage tank 410 and the gas storage tank 462, respectively. The seal 2 is fixed on the inside surface of the outer wall 1, the sealing plate 3 is fixed to one end of the spring 4, and the other end of the spring 4 is fixed to the outer wall 1. The sealing plate 3 will move up and down corresponding to the deformation of the spring 4. When the pressure difference between the pressure in the gas storage tank 462 and that in the liquid storage tank 410 is higher than a preset value, the spring 4 will be compressed and the sealing plate 3 will move down with the spring 4, thus the gas in the gas storage tank 462 can flow into the liquid storage tank 410.

The liquid storage devices according to the two embodiments mentioned above are basically the same, the operating principle of the liquid storage device presented in the second embodiment will be described as follows:

The gas intake tube 440 is used for supplying high purity N2 into the liquid storage tank 410 (In the liquid storage device according to the first embodiment, the high purity N2 can be supplied into the liquid storage tank 410 directly through the gas compensating tube 360). When liquid such as a different chemical reagent is supplied into the liquid storage tank 410 at a high flow rate through the liquid intake tube 420, the liquid level in the liquid storage tank 410 will rise remarkably, which may result in the compression of the high purity N2 and the increase of the gas pressure in the liquid storage tank 410. When the gas pressure in the liquid storage tank 410 exceeds the opening pressure of the check valve 451 on the gas discharge tube 450, the check valve 451 will open and the high purity N2 will flow out from the liquid storage tank 410 through the gas discharge tube 450.

When the liquid in the liquid storage tank 410 is discharged rapidly through the liquid discharge tube 430 and the pressure difference between the pressure in the gas storage tank 462 and that in the liquid storage tank 410 exceeds a first preset value, the spring 4 will be compressed (as shown in Fig.5) and the differential pressure mechanism 461 will open automatically, thus the high purity gas in the gas storage tank 462 will flow fast into the liquid storage tank 410. When the pressure difference between the pressure in the gas storage tank 462 and that in the liquid storage tank 410 is below a second preset value, the pressure difference will not overcome the elastic force of the spring 4, and the spring 4 will bounce and push the sealing plate 3 to the seal 2 tightly, thus the differential pressure mechanism 461 will close automatically. Wherein, the first preset value and the second preset value are related to the initial pressure in the gas storage tank, the type of the chemical liquid in the gas storage tank and the gas volume above the chemical liquid in the gas storage tank, respectively; and both the preset values can be measured according to the actual conditions. When the gas pressure in the gas storage tank 462 decreases, gas will be supplied into the gas storage tank 462 so as to increase the gas pressure to the initial pressure, namely, the pressure of the high purity N2 initially supplied into the gas storage tank 462.

The liquid storage device according to the present invention can be applied widely in the field of integrated circuit manufacturing technology to store the chemical liquids such as the liquid for cleaning the process machine.

In summary, the gas compensating tube is provided to replace the conventional liquid seal container, which can supply protective gas into the liquid storage tank quickly, prevent the chemical liquids in the liquid storage tank being damaged and enable a smooth discharge of the chemical liquids.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A liquid storage device, comprising:
   a liquid storage tank;
   a liquid intake tube, a liquid discharge tube and a gas discharge tube provided with a check valve all connected with the liquid storage tank; and
   a gas compensating tube connected with the liquid storage tank; wherein
   the gas compensating tube comprises a gas storage tank and a differential pressure mechanism having one end connected with the liquid storage tank and the other end connected with the gas storage tank for controlling the connection or disconnection between the liquid storage tank and the gas storage tank according to the pressure difference between pressure in the liquid storage tank which is determined by a liquid level therein and pressure in the gas storage tank;
   wherein, when the liquid level in the liquid storage tank rises as liquid being supplied through the liquid intake tube and gas pressure in the liquid storage tank increase and exceeds opening pressure of the check valve, the check valve opens to allow the gas in the liquid storage tank to flow out through the gas discharge tube;
   when the liquid in the liquid storage tank is discharged through the liquid discharge tube and the pressure difference between the pressure in the gas storage tank and the pressure in the liquid storage tank exceeds a first preset value, the differential pressure mechanism opens automatically to connect the liquid storage tank and the gas storage tank; when the pressure difference between the pressure in the gas storage tank and that in the liquid storage tank is below a second preset value, the differential pressure mechanism closes automatically to disconnect the liquid storage tank and the gas storage tank.

2. The device according to claim 1, wherein the differential pressure mechanism comprises an outer wall, a seal, a sealing plate, and an elastic element; one end of the outer wall is connected with the liquid storage tank, and the other end is connected with the gas storage tank; the seal is fixed on the inside surface of the outer wall; the sealing plate is fixed to one end of the elastic element and moves up and down to be pushed to the seal or not corresponding to the deformation of the elastic element so as to close or open the tube between the liquid storage tank and the gas storage tank; the other end of the elastic element is fixed to the outer wall.

3. The device according to claim 2, wherein the elastic element is a spring.

4. The device according to claim 1, wherein the liquid intake tube, the gas discharge tube, and the gas compensating tube are all connected to the top wall of the liquid storage tank; the liquid discharge tube is connected the bottom wall of the liquid storage tank.

5. The device according to claim 4, wherein the liquid intake tube is provided with a first valve, the liquid discharge tube is provided with a second valve.

6. The device according to claim 5, wherein, the shape of the liquid storage tank is cylinder, cone, cuboid, or a combination of cylinder and cone.

7. The device according to claim 1, further comprising a gas intake tube connected with the liquid storage tank.

8. The device according to claim 7, wherein the gas intake tube is connected to the top wall of the liquid storage tank.

9. The device according to claim 8, wherein the gas intake tube is provided with a third valve.

10. The device according to claim 9, wherein the shape of the liquid storage tank is cylinder, cone, cuboid, or a combination of cylinder and cone.

11. The device according to claim 2, wherein the liquid intake tube, the gas discharge tube, and the gas compensating tube are all connected to the top wall of the liquid storage tank; the liquid discharge tube is connected the bottom wall of the liquid storage tank.

12. The device according to claim 3, wherein the liquid intake tube, the gas discharge tube, and the gas compensating tube are all connected to the top wall of the liquid storage tank; the liquid discharge tube is connected the bottom wall of the liquid storage tank.

13. The device according to claim 2, further comprising a gas intake tube connected with the liquid storage tank.

14. The device according to claim 3, further comprising a gas intake tube connected with the liquid storage tank.

* * * * *